United States Patent [19]

Kisselmann et al.

[11] 3,715,658

[45] Feb. 6, 1973

[54] ROTARY COIL ASSEMBLY WITH COUNTER-BALANCE FOR AN ELECTRICAL MEASURING INSTRUMENT AND METHOD OF MAKING THE SAME

[75] Inventors: Willy Kisselmann, Gruenwald; Fritz Ruempelein, Munich; Paul Kopf, Unterhaching, all of Germany

[73] Assignee: Agfa-Gevaert Aktiengesellschaft, Leverkusen, Germany

[22] Filed: Dec. 10, 1971

[21] Appl. No.: 206,668

[30] Foreign Application Priority Data

Dec. 11, 1970 Germany....................P 20 60 986.3

[52] U.S. Cl............................324/154 PB, 116/136.5
[51] Int. Cl. ........................G01r 1/00, G01d 13/22
[58] Field of Search...............324/154 PB; 116/136.5

[56] References Cited

UNITED STATES PATENTS 3,619,779   11/1971   Kisselmann et al.............324/154 PB Primary Examiner—Alfred E. Smith
Attorney—Michael S. Striker

[57] ABSTRACT

A rotary coil for an electrical measuring instrument is made by providing the coil frame with a winding and with needle bearings. A pointer is mounted on the frame and a section of synthetic plastic material is mounted on the frame as a counterbalance. The section is heavier than the pointer and is provided with an arcuate wall portion curved over a portion of arc with a plane of symmetry coinciding with the axis of rotation of the frame. The wall portion is then provided with one or more slots so located, and with sufficient material being removed, that the existing imbalance is corrected and the coil is balanced.

6 Claims, 3 Drawing Figures

PATENTED FEB 6 1973

3,715,658

*INVENTOR*
WILLY KISSELMANN
FRITZ RÜMPELEIN
BY  PAUL KOPF

3,715,658

ROTARY COIL ASSEMBLY WITH COUNTERBALANCE FOR AN ELECTRICAL MEASURING INSTRUMENT AND METHOD OF MAKING THE SAME

BACKGROUND OF THE INVENTION

The present invention relates generally to a rotary coil, and in particular to a rotary coil for an electrical measuring instrument. The invention also relates to a method of making such a coil.

Rotary coils for electrical measuring instruments are too well known to require detailed discussion. It simply need be pointed out that such coils utilize a frame which carries a winding and is provided with two bearing needles by means of which the frame can be mounted for rotation about an axis. The frame in turn carries a component which tends to make the coil imbalanced with reference to the axis of rotation, for instance a pointer or indicator. In order to balance the coil—an imbalance must not exist—a suitable counterbalancing weight is also provided on the frame. The problem with the prior art is that the counterbalancing of such coil is rather difficult to achieve with the necessary precision, and is therefore complicated and time-consuming, meaning that the counterbalancing operation increases the expense involved in the production of such coils.

SUMMARY OF THE INVENTION

It is, consequently, a general object of the present invention to overcome the disadvantages of the prior art.

More particularly it is an object of the present invention to provide an improved rotary coil of the type here under discussion which avoids these disadvantages.

Still more particularly it is an object of the present invention to provide such an improved rotary coil which is precisely balanced in a simple and effective manner.

A concomitant object of the invention is to provide a method of producing such a coil, and in particular of balancing the same.

In pursuance of these and other objects which will become apparent hereafter, one feature of the invention resides in a rotary coil for an electrical measuring instrument which, briefly stated, comprises a frame provided with a winding, and journalling means for journalling the frame with freedom of rotation about an axis. A component is mounted on the frame and has a first portion, and a second portion which constitutes a counterbalance for the first portion and which has a wall section curved over a portion of arc a plane of symmetric of which coincides with the axis of rotation. The second portion is initially heavier than the first portion so that the coil is imbalanced. However, the second portion is provided with at least one slot formed in the wall section thereof, the slot being of such a size and being located in such a manner that the imbalance of the coil is avoided.

It will be seen that such coil avoids the disadvantages of the prior art, and a method of making the coil simply requires that the second portion—which is preferably of synthetic plastic material—be of such weight that prior to the balancing of the coil it will be heavier than the first portion, taking into account all possible fluctuations in the weight of the first and the second portions within permissible tolerance limits. In other words, given the possibility that within the existing tolerance limits the first portion might exceed its intended weight, or that the second portion might be below its intended weight, the second portion must under all circumstances be heavier than the first portion. The imbalance is then, that is when the coil is assembled, determined either statically or dynamically in accordance with known techniques, and thereupon it is removed by forming in the wall portion or wall section of the second portion one or more slots at the location or locations which are required—and of a size which is necessary—in order to remove the imbalance and balance the coil.

It is advantageous that the second portion be of a synthetic plastic material, because this makes it possible for the radius of curvature of the arc of the wall section to be so large—due to the lesser weight of the synthetic plastic as opposed to other materials—that the balancing of the previously fully assembled rotary coil can be carried out in a very simple and very precise manner by formation of the slot or slots therein. Also, by making the wall section curved over a portion of arc it is possible to remove the imbalance by simply forming at any desired point or location of the wall section a slot the width and depth of which is a measure of the existing imbalance, that is the imbalance which existed before formation of the slot.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 2:
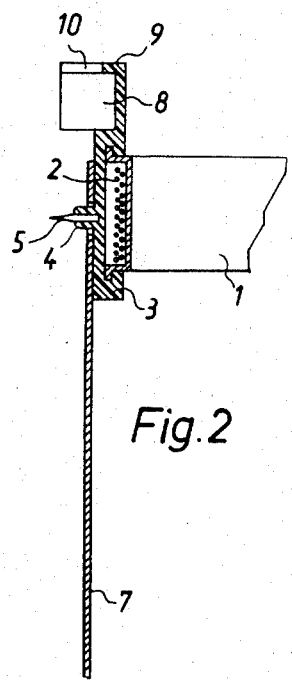
FIG. 2 is a section taken on line II—II of FIG. 1.
Figure 1:
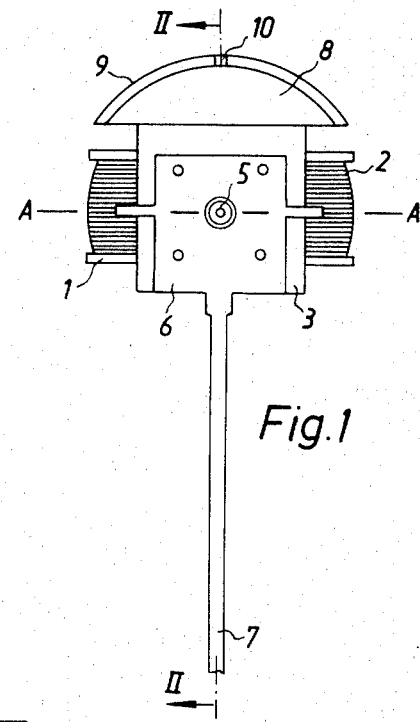
FIG. 1 is an elevational view of a rotary coil according to the present invention.
Figure 3:
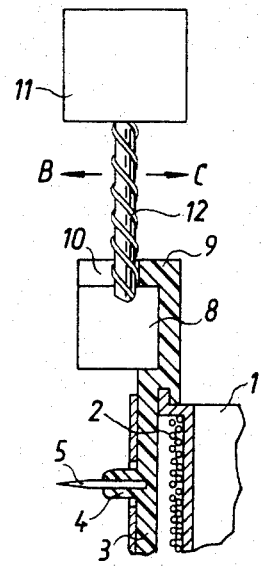
FIG. 3 is a fragmentary sectioned detail view illustrating the second portion of the coil according to the present invention during the balancing operation.

Referring now to the drawing, it will be seen that the novel rotary coil according to the present invention has in conventional manner a frame which is designated in FIGS. 1–3 with reference numeral 1. The frame carries, again in conventional manner, a winding 2, as well as a journal mount 3 which is pushed onto the frame (see FIG. 2) and advantageously consists of synthetic plastic material. The mount 3 is provided with a projection 4 in which one (two are provided, but only one is shown) of the bearing needles 5 is embedded. The bearing needles will be coaxial at opposite sides of the frame 1 so that the latter can be mounted via the bearing needles 5 for free turning movement about an axis of rotation. In known manner the bearing mount 3 has elastically yieldable characteristics so that in the event of transmission of impacts to the rotary coil, such impacts are absorbed. This, however, does not form a part of the present invention.

The bearing mount 3 carries a first portion of a component, which is identified with reference numeral 6 and provided (here being of one piece with) the pointer or indicator 7.

The component mounted on the bearing mount 3 further comprises a second portion 8 which serves as a counterbalance for the first portion. In accordance with the present invention this second portion 8 is also of synthetic plastic material (many such materials are suitable for this purpose and are well known to those skilled in the art, and nylon is mentioned only by way of example) and is provided with a wall section (see particularly FIG. 1) which is curved along a portion of arc the plane of symmetry of which coincides with or passes through the axis of rotation of the coil, which axis is determined by the two bearing needles 5 (one shown and the non-illustrated one being coaxial with it).

As FIG. 1 shows, an imaginary plane A passing through the axis of rotation defined by the bearing needles 5 subdivides the rotary coil into two halves with the portion 6, 7 being located predominantly at one side and the portion 8 being located totally or at least predominantly at the other side of the imaginary plane A.

In accordance with the invention the weight of the portion 8 is so selected that when the coil is completely assembled as shown in FIG. 1 (but without the slot 10 shown in that Figure) the weight 8 will under all circumstances be heavier than the portion 6, 7, even if all possible overweight of the coil on that side of the plane A which is opposite the portion 8 are taken into consideration (within the permissible tolerance variations) and all possible similar deviations below the intended weight of the portion 8 which are possible within the tolerance variations permitted. In other words, the weight of the portion 8 must under all circumstances exceed the weight of the portion 6, 7 before balancing of the coil is carried out.

Such balancing is carried out subsequent to a determination of the imbalance. This determination may be carried out statically in accordance with known procedures, or it may be carried out dynamically. In the latter case the rotary coil is mounted in a suitable jig for rotation and is then caused to turn about its rotation axis, for instance by blowing a stream of fluid against it. After a certain period of time the fluid stream is terminated and the point at which imbalance exists in the rotary coil is determined, for instance by calculating it with the aid of a computer during the rotary movement of the coil. The coil is then stopped or permitted to come to a halt, and at the calculated point where the imbalance exists, a slot 10 is formed in the wall section 9 of the portion 8, the depth of the slot being determined by the amount of material which must be removed from the wall section 9 in order to correct the imbalance and cause the coil to be balanced. This is advantageously carried out, as indicated in FIG. 3, by the aid of a diagrammatically illustrated milling device 11, a cutter 12 of which is movable in the direction of the arrows B and C of FIG. 3. The depth to which the cutter 12 will form the slot 10 in the wall section 9 in the direction of the arrow C, will depend, as pointed out above, upon the amount of material which must be removed to correct the imbalance. It can be controlled by suitable means and abutments, for instance by an abutment which is set by the same computer previously used for determining the imbalance.

It will be understood that the exemplary embodiment disclosed herein, and the manner of producing and balancing the coil as discussed, are to be considered only as explanatory and that modifications are possible and will offer themselves to those skilled in the art without deviating from the concept and intent of the invention.

It will be understood that each of the elements described above, or two or more together, may also find a useful application in other types of constructions differing from the types described above.

While the invention has been illustrated and described as embodied in a rotary coil for an electrical measuring instrument, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be secured by Letters Patent is set forth in the appended claims.

1. A rotary coil for an electrical measuring instrument, comprising a frame provided with a winding; journalling means for journalling said frame with freedom of rotation about an axis; a component mounted on said frame and having a first portion, and a second portion constituting a counterbalance for said first portion and having a wall section which is curved over a portion of an arc a plane of symmetry of which coincides with said axis, said second portion being initially heavier than said first portion so that said coil is imbalanced; and at least one slot formed in said wall section of a size and at a location requisite for avoiding an imbalance of said coil.

2. A rotary coil as defined in claim 1, wherein at least said second portion is of synthetic plastic material.

3. A rotary coil as defined in claim 1, wherein said portions are each located at least predominantly at opposite sides of said axis.

4. A method of making a rotary coil for an electrical measuring instrument, comprising the steps of providing a frame carrying a winding; providing said frame with journalling means so that the frame may be journalled for rotation about an axis; mounting on said frame a component having a first portion, and a second portion which constitutes a counterbalance for said first portion and includes a wall section curved over a portion of an arc a plane of symmetry of which coincides with said axis, said second portion being heavier than said first portion so that the coil is imbalanced; and correcting the existing imbalance by removing material from said wall section in a quantity and at a location requisite for balancing said coil.

5. A method as defined in claim 4, wherein the step of correcting said imbalance comprises forming a slot in said wall section.

6. A method as defined in claim 5, wherein the step of forming a slot is carried out by milling.

* * * * *